United States Patent
Wu et al.

(10) Patent No.: US 9,864,363 B2
(45) Date of Patent: Jan. 9, 2018

(54) PROCESS CONTROL METHOD AND PROCESS CONTROL SYSTEM

(71) Applicant: Powerchip Technology Corporation, Hsinchu (TW)

(72) Inventors: Jyun-Da Wu, Taoyuan County (TW); Shih-Tsung Hsiao, Hsinchu (TW); Chien-Chung Chen, Hsinchu (TW); Huang-Wei Wu, Taoyuan County (TW); Huang-Wen Chen, Hsinchu (TW); Sheng-Hsiu Peng, Hsinchu County (TW)

(73) Assignee: Powerchip Technology Corporation, Hsinchu (TW)

( * ) Notice: Subject to any disclaimer, the term of this patent is extended or adjusted under 35 U.S.C. 154(b) by 610 days.

(21) Appl. No.: 14/529,181

(22) Filed: Oct. 31, 2014

(65) Prior Publication Data

US 2016/0047045 A1    Feb. 18, 2016

(30) Foreign Application Priority Data

Aug. 15, 2014  (TW) .............................. 103128152 A

(51) Int. Cl.
    *G05B 19/418*    (2006.01)
(52) U.S. Cl.
    CPC ....... *G05B 19/418* (2013.01); *G05B 19/4183* (2013.01); *G05B 2219/32074* (2013.01);
    (Continued)
(58) Field of Classification Search
    CPC .............. G05B 19/418; G05B 19/4183; G05B 2219/32074; Y02P 90/10
    See application file for complete search history.

(56) References Cited

U.S. PATENT DOCUMENTS

2005/0266696 A1* 12/2005 Wang ................... H01L 21/3185
                                                              438/758
2008/0153180 A1*  6/2008 Lansford .................. H01L 22/12
                                                                438/5
(Continued)

FOREIGN PATENT DOCUMENTS

TW              482967         4/2002
TW           200811745         3/2008
(Continued)

OTHER PUBLICATIONS

"Office Action of Taiwan Counterpart Application", dated Jul. 26, 2016, p. 1-p. 3.

*Primary Examiner* — Charles E Anya
(74) *Attorney, Agent, or Firm* — JCIPRNET

(57) ABSTRACT

A process control method is provided for performing a deposition process on a plurality of wafers of a batch. The process control method includes: deciding a placement location of the wafers of the batch according to the history information of a tool and the product information of the batch; calculating a target value of each placement location according to the placement location of the wafers of the batch and the history information of the tool; calculating a process parameter according to the history information of the tool, the product information of the batch, and the target value of each placement location; and performing a deposition process according to the placement location of the wafers of the batch and the process parameter.

18 Claims, 3 Drawing Sheets

(52) U.S. Cl.
CPC ............ *G05B 2219/32077* (2013.01); *G05B 2219/45031* (2013.01); *Y02P 90/10* (2015.11); *Y02P 90/20* (2015.11)

(56) References Cited

U.S. PATENT DOCUMENTS

2008/0275588 A1* 11/2008 Wang ................ G01N 21/9501
    700/121
2011/0264256 A1* 10/2011 Cheng .............. G05B 19/40937
    700/105

FOREIGN PATENT DOCUMENTS

| | | |
|---|---|---|
| TW | 201033844 | 9/2010 |
| TW | 201137547 | 11/2011 |
| TW | 201335983 | 9/2013 |

\* cited by examiner

PROCESS CONTROL METHOD AND PROCESS CONTROL SYSTEM

CROSS-REFERENCE TO RELATED APPLICATION

This application claims the priority benefit of Taiwan application serial no. 103128152, filed on Aug. 15, 2014. The entirety of the above-mentioned patent application is hereby incorporated by reference herein and made a part of this specification.

BACKGROUND OF THE INVENTION

Field of the Invention

The invention relates to a semiconductor process control method and system, and more particularly, to a deposition process control method and system.

Description of Related Art

In a semiconductor process, the furnace process is an important process step. A tool for the heat treatment in the semiconductor process is, for instance, a furnace that can fabricate a structure such as a gate oxide layer or a spacer oxide layer . . . etc. of a semiconductor device via heating and oxidation.

However, fixed process parameters are used in the furnace process of the prior art, and loading effect (different deposition rates caused by total number of wafers and pattern variation on the wafers) is often neglected, thus causing different variations to film thickness formed on the wafers in the case of different placement locations of the wafers in the furnace. Such variation includes wafer-to-wafer and within-wafer variations. Moreover, various pre-process variation factors such as linewidth and film thickness all cause variation to the threshold voltage or other characteristics of the fabricated semiconductor device.

As the size of the semiconductor device continues to be smaller, the demand for the quality of the film formed by the furnace process has become greater. Therefore, the focus of the furnace process is on the thickness of deposition on the actual product and not only on the thickness of the monitor wafer. However, during production, the actual deposition thickness of each product is very difficult to sample, such that instant adjustment of optimal parameters of the process cannot be achieved. As a result, the deposition thickness of the process results is significantly deviated from the standard values.

SUMMARY OF THE INVENTION

The invention provides a process control method capable of reducing electrical and physical difference caused by the process, thus increasing process accuracy.

The invention provides a process control system capable of reducing process time and increasing yield.

The invention provides a process control method for performing a deposition process on a plurality of wafers of a batch. The process control method includes: deciding a placement location of the wafers of the batch according to a history information of a tool and a product information of the batch; calculating a target value of each placement location according to the placement location of the wafers of the batch and the history information of the tool; calculating a process parameter according to the history information of the tool, the product information of the batch, and the target value of each placement location; and performing a deposition process according to the placement location of the wafers of the batch and the process parameter.

In an embodiment of the invention, in the step of deciding the placement location of the wafers of the batch according to the history information of the tool and the product information of the batch, a minimum variation combination is calculated from formula (1) to perform location sorting on the wafers of the batch:

$$\min\left(\sum_{i,j,k} L(i) \times F(j) \times w(k)\right) \quad (1)$$

in formula (1), L(i) is the characteristic of each batch before the process, F(j) is the uniformity characteristic of process location, and w(k) is the weight of each product toward variation requirement.

In an embodiment of the invention, in the process control method, a target value of a specific location L of wafer placement is calculated from formula (2):

$$\text{Monitor Target}^L = \alpha + \gamma(\text{thickness target value}) + \beta(\text{product|thickness target value}) \quad (2)$$

in formula (2), $\alpha$ is a basic deposition thickness value of a monitor wafer under a specific process method; $\gamma$ is an adjustment value of deposition thickness of the monitor wafer of all of the products under different target values; and $\beta$ is an adjustment value of deposition thickness on the product of each product under a specific target value.

In an embodiment of the invention, the process parameter includes a heating region temperature and a deposition time calculated according to a loading effect relationship, and the process parameter is obtained by calculating the deposition time first and then calculating the temperature needed for the heating region.

In an embodiment of the invention, the deposition time is calculated from formula (3):

$$\text{time}_t = g(\text{time}_{t-i}, \text{Monitor Target}_{t-i}^{CEN}, \text{THK}_{t-i}^{CEN}, \text{wafer count}_{t-i}, \text{Patten}_{t-i}) + m(\text{Monitor Target}_t^{CEN}, \text{wafer count}_t, \text{Patten}_t) \quad (3)$$

in formula (3), $\text{time}_t$ is the deposition time of a (t)th batch, the function of g(x) is feedback control, the function of m(x) is feedforward control, $\text{time}_{t-i}$ is the deposition time of a (t−1)th batch, $\text{Monitor Target}_{t-i}^{CEN}$ is the target value of deposition thickness of the middle location of the (t−1)th batch, $\text{Monitor Target}_t^{CEN}$ is the target value of deposition thickness of the middle location of the (t)th batch, $\text{THK}_{t-i}^{CEN}$ is the deposition thickness value of the middle location of the (t−1)th batch, wafer count$_t$ is the number of wafers of the (t)th batch, wafer count$_{t-i}$ is the number of wafers of the (t−1)th batch, Patten$_t$ is the characteristic value of the (t)th batch, and Patten$_{t-i}$ is the characteristic value of the (t−1)th batch.

In an embodiment of the invention, the heating region temperature is calculated from formula (4):

$$\text{temperature}_t^L = f(\text{time}_{t-i}, \text{temperature}_{t-i}^L, \text{Monitor Target}_{t-i}^L, \text{THK}_{t-i}^L, \text{wafer count}_{t-i}, \text{Patten}_{t-i}) + y(\text{Monitor Target}_{t-i}^L, \text{wafer count}_t, \text{Patten}_t) \quad (4)$$

in formula (4), $\text{temperature}_t^L$ is the temperature of the heating region of the specific location L of the (t)th batch, the function of f(x) is feedback control, the function of y(x) is feedforward control, $\text{time}_{t-i}$ is the deposition time of the (t−1)th batch, $\text{temperature}_{t-i}^L$ is the temperature of the heating region of the specific location L of the (t−1)th batch, $\text{Monitor Target}_{t-i}^L$ is the target value of deposition thickness of the specific location L of the (t−1)th batch, Monitor Target$_t^L$ is the target value of deposition thickness of the specific location L of the (t)th batch, THK$_{t-i}^L$ is the deposition thickness value of the specific location L of the (t−1)th batch, wafer count$_t$ is the number of wafers of the (t)th batch, wafer count$_{t-i}$ is the number of wafers of the (t−1)th batch, Pattern$_t$ is the characteristic value of the (t)th batch, and Pattern$_{t-i}$ is the characteristic value of the (t−1)th batch.

In an embodiment of the invention, the tool includes a furnace.

In an embodiment of the invention, the deposition process can be performed on the wafers of the batch via a mixed product method.

In an embodiment of the invention, the product information of the batch includes number of wafers and product characteristic value.

In an embodiment of the invention, the history information of the tool includes deposition time, deposition thickness, number of wafers, and product characteristic value of the history.

The invention further provides a process control system for performing a deposition process on a plurality of wafers of a batch. The system includes: a tool, a database, an advanced dispatch control unit, a predicted target unit, an advanced process control unit, and a manufacturing execution unit. The tool performs a deposition process on the plurality of wafers of the batch. The database is used to store and provide the history information of the tool. The advanced dispatch control unit decides the placement location of each wafer according to the history information of the tool from the database and the product information of the batch. The predicted target unit calculates the target value of each placement location according to the placement location of each wafer from the advanced dispatch control unit and the history information of the tool. The advanced process control unit calculates a process parameter according to the history information of the tool from the database, the product information of the batch, and the target value of each placement location from the advanced dispatch control unit. The manufacturing execution unit drives the tool to perform the deposition process of the wafers according to the placement location of the wafers from the advanced dispatch control unit and the process parameter from the advanced process control unit.

In an embodiment of the invention, the placement location of each wafer is obtained by performing location sorting on the wafers of the batch by calculating the minimum variation combination from formula (1) with the history information of the tool and the product information of the batch:

$$\min\left(\sum_{i,j,k} L(i) \times F(j) \times w(k)\right) \quad (1)$$

in formula (1), L(i) is the characteristic of each batch before the process, F(j) is the uniformity characteristic of process location, and w(k) is the weight of each product toward variation requirement.

In an embodiment of the invention, the target value of the specific location L of the placement of the wafers is calculated from formula (2):

$$\text{Monitor Target}^L = \alpha + \gamma(\text{thickness target value}) + \beta(\text{product|thickness target value}) \quad (2)$$

in formula (2), α is a basic deposition thickness value of a monitor wafer under a specific process method; γ is an adjustment value of deposition thickness of the monitor wafer of all of the products under different target values; and β is an adjustment value of deposition thickness on the product of each product under a specific target value.

In an embodiment of the invention, the process parameter includes heating region temperature and deposition time calculated according to a loading effect relationship, and the process parameter is obtained by calculating deposition time first and then calculating the temperature needed for the heating region.

In an embodiment of the invention, the deposition time is calculated from formula (3):

$$\text{time}_t = g(\text{time}_{t-i}, \text{Monitor Target}_{t-i}^{CEN}, THK_{t-i}^{CEN}, \text{wafer count}_{t-i}, \text{Patten}_{t-i}) + m(\text{Monitor Target}_t^{CEN}, \text{wafer count}_t, \text{Patten}_t) \quad (3)$$

in formula (3), time$_t$ is the deposition time of a (t)th batch, the function of g(x) is feedback control, the function of m(x) is feedforward control, time$_{t-i}$ is the deposition time of a (t−1)th batch, Monitor Target$_{t-i}^{CEN}$ is the target value of deposition thickness of the middle location of the (t−1)th batch, Monitor Target$_t^{CEN}$ is the target value of deposition thickness of the middle location of the (t)th batch, THK$_{t-i}^{CEN}$ is the deposition thickness value of the middle location of the (t−1)th batch, wafer count$_t$ is the number of wafers of the (t)th batch, wafer count$_{t-i}$ is the number of wafers of the (t−1)th batch, Pattern$_t$ is the characteristic value of the (t)th batch, and Pattern$_{t-i}$ is the characteristic value of the (t−1)th batch.

In an embodiment of the invention, the heating region temperature is calculated from formula (4):

$$\text{temperature}_t^L = f(\text{time}_{t-i}, \text{temperature}_{t-i}^L, \text{Monitor Target}_{t-i}^L, THK_{t-i}^L, \text{wafer count}_{t-i}, \text{Patten}_{t-i}) + y(\text{Monitor Target}_{t-i}^L, \text{wafer count}_t, \text{Patten}_t) \quad (4)$$

in formula (4), temperature$_t^L$ is the temperature of the heating region of the specific location L of the (t)th batch, the function of f(x) is feedback control, the function of y(x) is feedforward control, time$_{t-i}$ is the deposition time of the (t−1)th batch, temperature$_{t-i}^L$ is the heating region temperature of the specific location L of the (t−1)th batch, Monitor Target$_{t-i}^L$ is the target value of deposition thickness of the specific location L of the (t−1)th batch, Monitor Target$_t^L$ is the target value of deposition thickness of the specific location L of the (t)th batch, THK$_{t-i}^L$ is the deposition thickness value of the specific location L of the (t−1)th batch, wafer count$_t$ is the number of wafers of the (t)th batch, wafer count$_{t-i}$ is the number of wafers of the (t−1)th batch, Pattern$_t$ is the characteristic value of the (t)th batch, and Pattern$_{t-i}$ is the characteristic value of the (t−1)th batch.

In an embodiment of the invention, the tool includes a furnace.

In an embodiment of the invention, the deposition process can be performed on the wafers of the batch via a mixed product method.

In an embodiment of the invention, the product information of the batch includes number of wafers and product characteristic value.

In an embodiment of the invention, the history information of the tool includes deposition time, deposition thickness, number of wafers, and product characteristic value of the history.

Based on the above, in the invention, since before each deposition process, the placement location of the wafers of a batch is decided according to the history information of the tool and the product information (such as number of wafers and pattern density) of the batch, the target value of each placement location is calculated according to the placement location of the wafers of the batch and the history information of the tool, the process parameter (such as deposition time and temperature) is calculated according to the history information of the tool, the product information of the batch, and the target value of each placement location, and the deposition process is performed according to the placement location of the wafers of the batch and the process parameter, variation to film thickness caused by different placement locations and different deposition loads can be reduced. Therefore, the process control method and the process control system of the invention can effectively reduce film thickness, electrical and physical difference, increase process accuracy, reduce process time, and increase yield.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
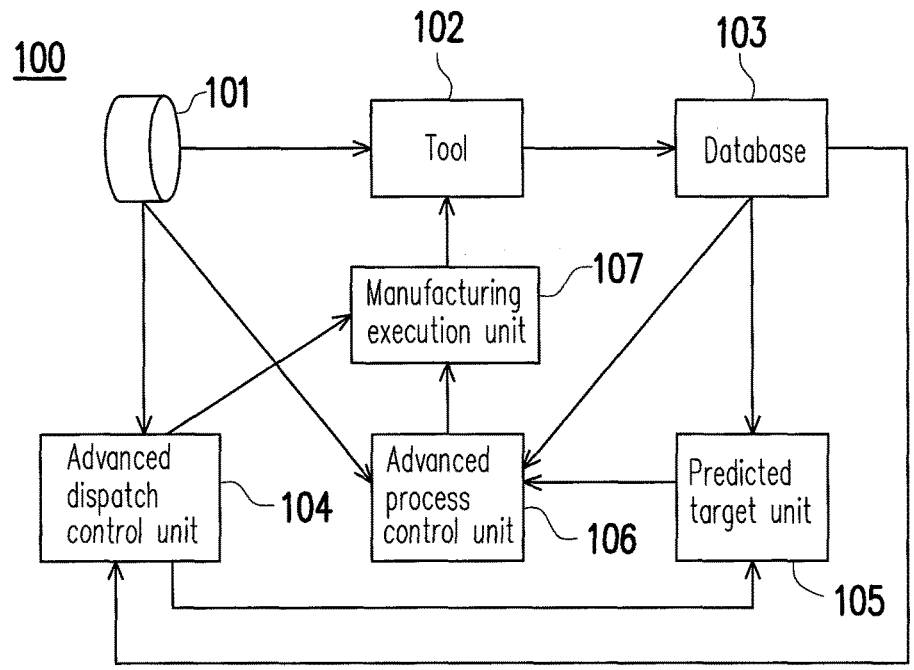
FIG. 1 shows a schematic of a process control system of an embodiment of the invention.

FIG. 1 shows a schematic of a process control system of an embodiment of the invention.

First, referring to FIG. 1, a process control system 100 of the invention is described. The process control system 100 of the invention performs a deposition process on a plurality of wafers 101 of a batch.

The process control system 100 includes: a tool 102, a database 103, an advanced dispatch control unit 104, a predicted target unit 105, an advanced process control unit 106, and a manufacturing execution unit 107.

The tool 102 is connected to the plurality of wafers 101 of the batch, the database 103, and the manufacturing execution unit 107, and is used to perform a deposition process on a plurality of wafers of a batch. Moreover, the tool 102 receives the fed plurality of wafers 101 of the batch and the placement location and process parameter set by the manufacturing execution unit 107 so as to perform a deposition process on the plurality of wafers 101 of the batch.

Moreover, before the plurality of wafers 101 of the batch is loaded into the tool 102, or after the plurality of wafers 101 of the batch is loaded into the tool 102 and before the deposition process is started, the product information (such as number of wafers and product characteristic value) of the batch of the plurality of wafers 101 of the batch to be loaded into the tool 102 or already placed in the tool 102 can be entered manually by a user or automatically imported by the system. Then, the product information of the batch can respectively be transmitted to the advanced dispatch control unit 104 and the advanced process control unit 106 for calculation.

The database 103 is connected to the tool 102, the advanced dispatch control unit 104, the predicted target unit 105, and the advanced process control unit 106, and is used to store and provide the history information of the tool 102. Moreover, the database 103 is used to store the history information (such as deposition time, deposition thickness, number of wafers, and product characteristic value) from the tool 102 and to respectively provide the history information to the advanced dispatch control unit 104, the predicted target unit 105, or the advanced process control unit 106 for calculation.

The advanced dispatch control unit 104 decides the placement location of each wafer according to the history information of the tool 102 from the database 103 and the product information of the batch. Moreover, the advanced dispatch control unit 104 provides the placement location information of each wafer to the manufacturing execution unit 107.

The predicted target unit 105 calculates the target value of each placement location according to the placement location of each wafer from the advanced dispatch control unit 104 and the history information of the tool 102. Moreover, the predicted target unit 105 provides the target value information of each placement location to the advanced process control unit 106 for calculation.

The advanced process control unit 106 calculates a process parameter according to the history information of the tool 102 from the database 103, the product information of the batch, and the target value of each placement location from the advanced dispatch control unit 104. In particular, the process parameter is, for instance, heating region temperature or deposition time.

The manufacturing execution unit 107 drives the tool 102 to perform the deposition process of the wafers according to the placement location of the wafers from the advanced dispatch control unit 104 and the process parameter from the advanced process control unit 106.

In an embodiment, the tool is, for instance, a furnace. In particular, the placement location in the furnace can be, for instance, divided into an upper portion, an upper-middle portion, a middle portion, a lower-middle portion, and a lower portion, and a monitor wafer can be placed in the upper portion, the middle portion, and the lower portion. In particular, the monitor wafer is placed in the tool and is used to test, for instance, furnace temperature, chemical concentration, and deposition thickness. Moreover, the product information includes number of wafers and product characteristic value. The history information of the tool refers to the product information after the deposition process, and includes, for instance, deposition time, deposition thickness, number of wafers, and product characteristic value of the history. The process control method of an embodiment of the invention is more specifically described in the following.

Figure 2:
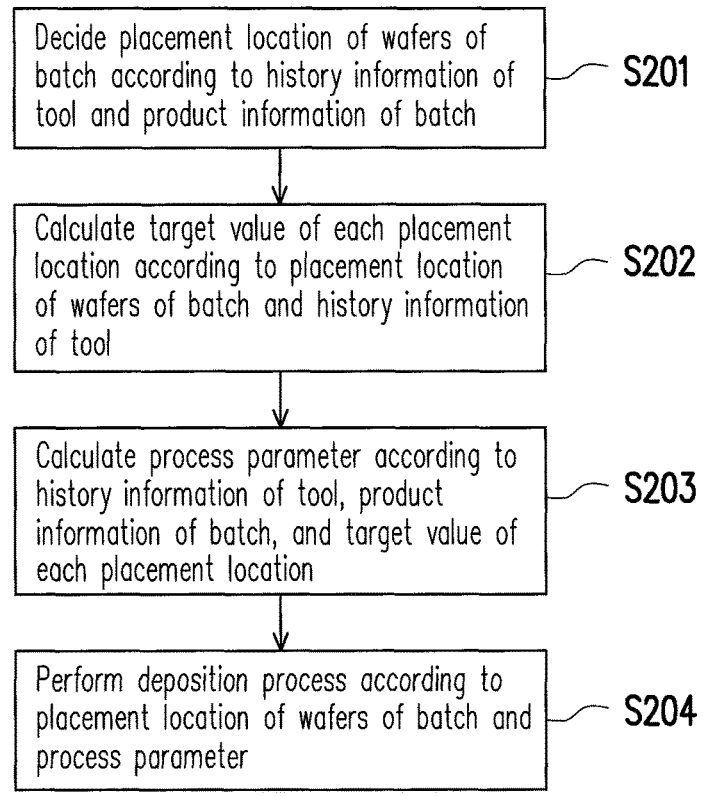
FIG. 2 shows a flowchart of a process control method of an embodiment of the invention.

FIG. 2 shows a flowchart of a process control method of an embodiment of the invention. Then, referring to FIG. 2, the process control method of the invention is described. The method includes: deciding the placement location of the wafers of a batch (step S201), calculating a target value of each placement location (step S202), calculating a process parameter (step S203), and performing a deposition process (step S204).

First, the step of deciding of the placement location of the wafers of the batch (step S201) is described. For a batch of wafers (such as the batch of wafers 101 shown in FIG. 1), before the tool 102 performs the deposition process, the placement location of the wafers of the batch is decided according to the history information and the product information of the plurality of wafers 101 of the batch provided by the database 103 via the advanced dispatch control unit 104 (step S201).

Figure 3:
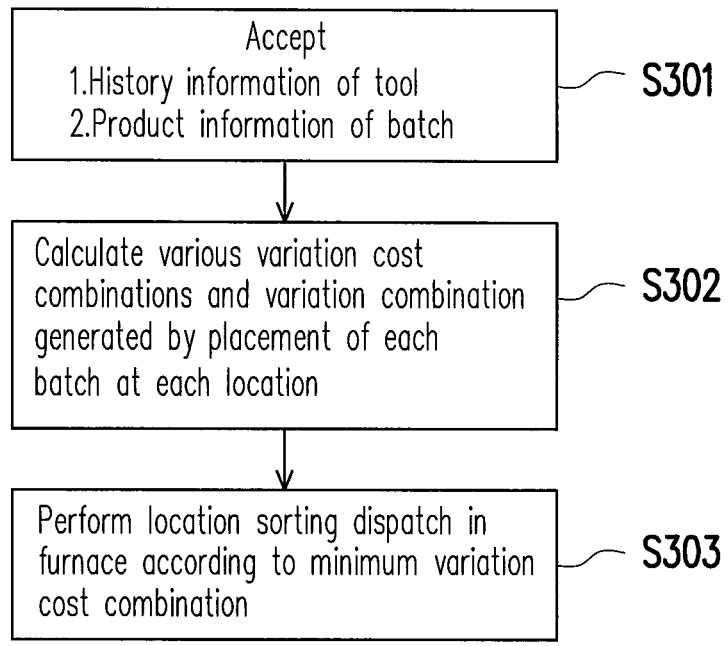
FIG. 3 shows an analysis flowchart of an advanced dispatch unit of an embodiment of the invention.

The analysis process of the advanced dispatch control unit 104 is described in the following. FIG. 3 shows an analysis flowchart of the advanced dispatch unit 104 of an embodiment of the invention. As shown in FIG. 3, first, in step S301, the advanced dispatch control unit 104 receives the history information (such as deposition time, deposition thickness, number of wafers, and product characteristic value, for instance, deposition thickness can be thickness uniformity (THK U %) of the production tool at different locations) and the product information (such as number of wafers and product characteristic value, for instance, product characteristic value can be critical dimension uniformity (CD U %) or thickness uniformity) of the batch stored in the production tool of the database 103. Then, in step S302, various variation cost combinations and variation combinations generated by each batch placed in each location are calculated by formula (1) to obtain the minimum variation combination so as to perform location sorting on the wafers of the batch in the furnace:

$$\min\left(\sum_{i,j,k} L(i) \times F(j) \times w(k)\right) \quad (1)$$

in formula (1), $L(i)$ is the characteristic of each batch before the process such as CD U % or THK U %; $F(j)$ is the uniformity characteristic of process location such as THK U %; and $w(k)$ is the weight of each product toward variation requirement. In step S303, according to the calculation results of formula (1), the dispatch of location sorting of wafers of the batch in the furnace is performed according to the minimum variation cost combination.

Then, as shown in FIG. 2, the target value of each placement location is calculated according to the placement location of the wafers of the batch and the history information provided by the database 103 via the predicted target unit 105 (step S202).

Figure 4:
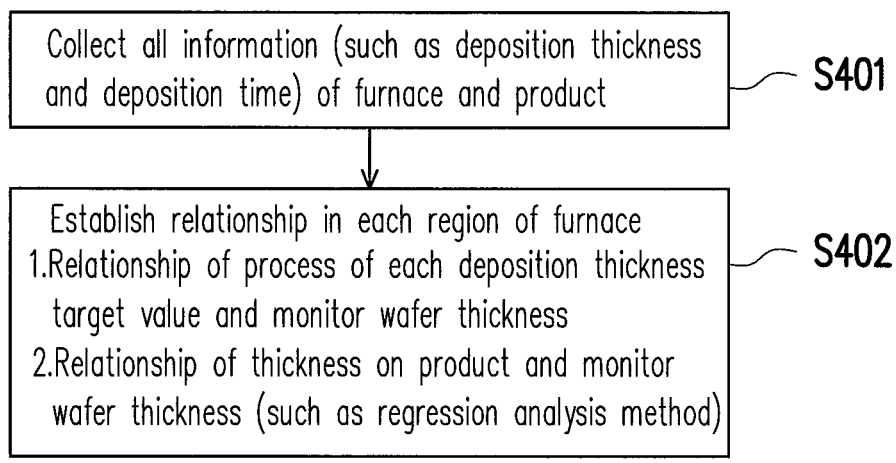
FIG. 4 shows an analysis flowchart of a predicted target unit of an embodiment of the invention.

The analysis process of the predicted target unit 105 is described in the following. FIG. 4 shows an analysis flowchart of a predicted target unit of an embodiment of the invention. As shown in FIG. 4, first, in step S401, the predicted target unit 105 of the process control system 100 collects the history information of the tool 102 and the product information of all the batches, such as number of wafers, deposition time, deposition thickness, and product characteristic value. Then, in step S402, the following relationship is established via a method of regression analysis: 1. the relationship of the process of each deposition thickness target value and monitor wafer thickness; and 2. the relationship of thickness on the product and the monitor wafer. The optimal target value of the monitor wafer of each region on the tool 102 is provided to achieve the target value of thickness on the product. In particular, the target value of the specific location L of wafer placement is calculated from formula (2):

$$\text{Monitor Target}^L = \alpha + \gamma(\text{thickness target value}) + \beta(\text{product|thickness target value}) \quad (2)$$

in formula (2), $\alpha$ is a basic deposition thickness value of a monitor wafer under a specific process method; $\gamma$ is an adjustment value of deposition thickness of the monitor wafer of all of the products under different target values; and $\beta$ is an adjustment value of deposition thickness on the product of each product under a specific target value.

Then, as shown in FIG. 2, via the advanced process control unit 106, the process parameter is calculated according to the history information of the tool 102, the product information of the plurality of wafers 101 of the batch, and the target value of each placement location obtained from step S202 provided by the database 103 (step S203).

Figure 5:
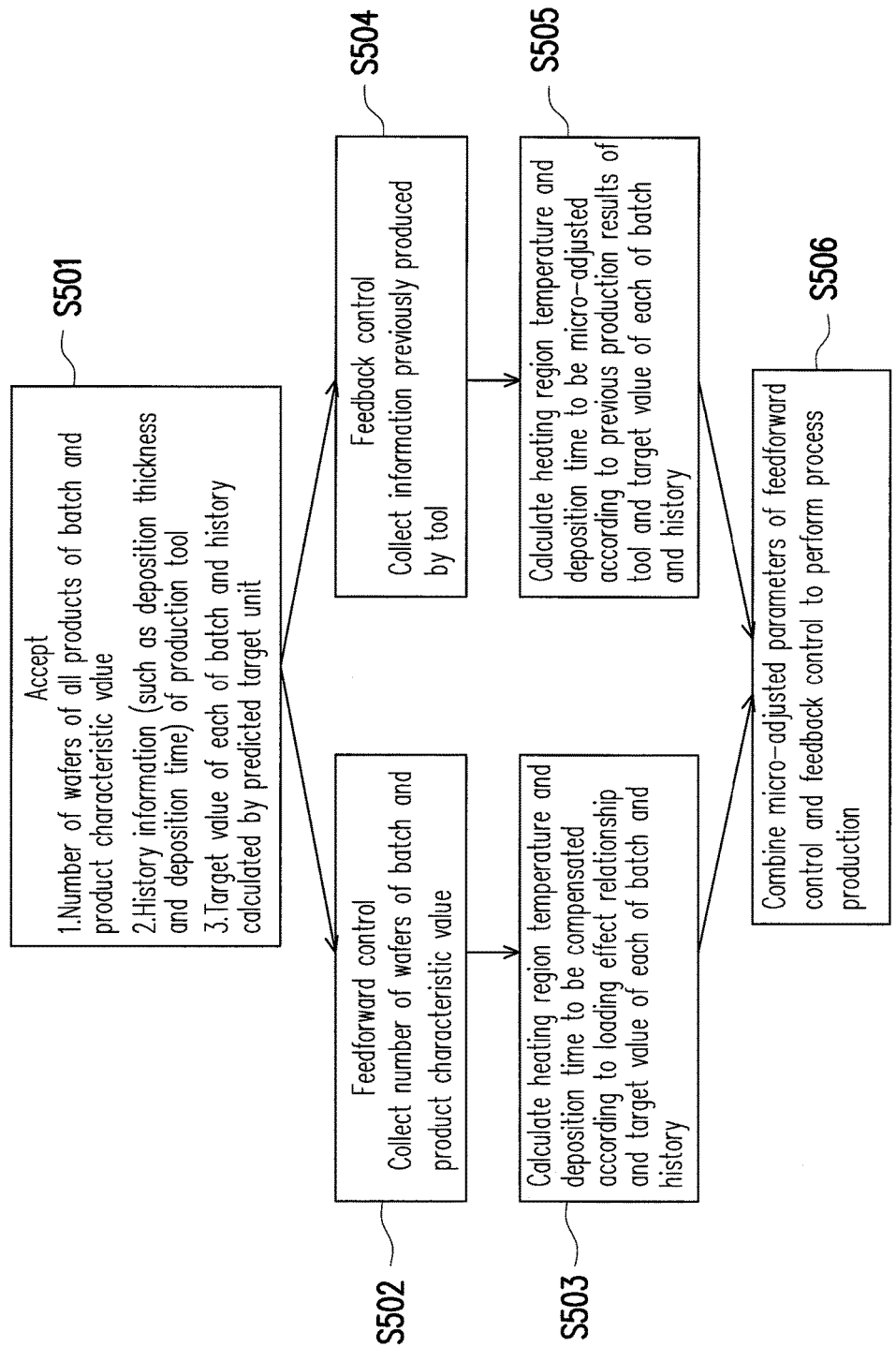
FIG. 5 shows an analysis flowchart of an advanced process control unit of an embodiment of the invention.

The analysis process of the advanced process control unit 106 is described in the following. FIG. 5 shows an analysis flowchart of an advanced process control unit of an embodiment of the invention. In step S501, the advanced process control unit 106 receives the history information of the production tool 102 stored in the database 103, the product information of the batch, and the target value of each of the batch and the history calculated by the predicted target unit 105, and can be divided into feedforward control (step S502 and step S503) and feedback control (step S504 and step S505). The feedforward control collects the number of wafers of the batch and the product characteristic value (step S502), and calculates heating region temperature and deposition time to be compensated according to the loading effect relationship and the target value of each of the batch and the history calculated from the predicted target unit 105 (step S503). In particular, in step S503, the process parameter includes heating region temperature and deposition time calculated according to the loading effect relationship, and the process parameter is obtained by calculating deposition time first and then calculating the temperature needed for the heating region.

The feedback control portion is used to receive the information (i.e., history information of tool) produced by the tool and stored in the database 103 (step S504). The heating region temperature and the deposition time to be micro-adjusted are calculated according to the previous production results of the tool and the target value of each of the batch and the history calculated from the predicted target unit 105 (step S505). Therefore, in step S506, the optimal process parameter produced by the process is performed according to the parameter micro-adjustment of the feedforward control and the feedback control. In particular, adjustment of temperature is not performed on the heating region in the middle of the furnace, and deposition time is used as the adjustment parameter.

The deposition time is calculated from formula (3):

$$\text{time}_t = g(\text{time}_{t-i}, \text{Monitor Target}_{t-i}^{CEN}, \text{THK}_{t-i}^{CEN}, \text{wafer count}_{t-i}, \text{Patten}_{t-i}) + m(\text{Monitor Target}_t^{CEN}, \text{wafer count}_t, \text{Patten}_t) \quad (3)$$

in formula (3), $\text{time}_t$ is the deposition time of a (t)th batch, the function of $g(x)$ is feedback control, the function of $m(x)$ is feedforward control, $\text{time}_{t-i}$ is the deposition time of a (t−1)th batch, Monitor Target$_{t-i}^{CEN}$ is the target value of deposition thickness of the middle location of the (t−1)th batch, Monitor Target$_t^{CEN}$ is the target value of deposition thickness of the middle location of the (t)th batch, THK$_{t-i}^{CEN}$ is the deposition thickness value of the middle location of the (t−1)th batch, wafer count$_t$ is the number of wafers of the (t)th batch, wafer count$_{t-i}$ is the number of wafers of the (t−1)th batch, Pattern$_t$ is the characteristic value of the (t)th batch, and Pattern$_{t-i}$ is the characteristic value of the (t−1)th batch. In particular, the feedforward control is a function of $m(x)$ and is influenced by the product information of the batch, such as the number of wafers of the batch and the product characteristic value. Moreover, the feedback control is a function of g(x), and is influenced by the results of the previous deposition process (i.e., the history information of the tool). The influencing factors contain, for instance, deposition time, deposition thickness, number of wafers, and product characteristic value of the history.

The heating region temperature is calculated from formula (4):

$$\text{temperature}_t^L = f(\text{time}_{t-i}, \text{temperature}_{t-i}^L, \text{Monitor Target}_{t-i}^L, \text{THK}_{t-i}^L, \text{wafer count}_{t-i}, \text{Pattern}_{t-i}) + y(\text{Monitor Target}_t^L, \text{wafer count}_t, \text{Pattern}_t) \quad (4)$$

in formula (4), $\text{temperature}_t^L$ is the temperature of the heating region of the specific location L of the (t)th batch, the function of f(x) is feedback control, the function of y(x) is feedforward control, $\text{time}_{t-i}$ is the deposition time of the (t−1)th batch, $\text{temperature}_{t-i}^L$ is the heating region temperature of the specific location L of the (t−1)th batch, Monitor $\text{Target}_{t-i}^L$ is the target value of deposition thickness of the specific location L of the (t−1)th batch, Monitor $\text{Target}_t^L$ is the target value of deposition thickness of the specific location L of the (t)th batch, $\text{THK}_{t-i}^L$ is the deposition thickness value of the specific location L of the (t−1)th batch, $\text{wafer count}_t$ is the number of wafers of the (t)th batch, $\text{wafer count}_{t-i}$ is the number of wafers of the (t−1)th batch, $\text{Pattern}_t$ is the characteristic value of the (t)th batch, and $\text{Pattern}_{t-i}$ is the characteristic value of the (t−1)th batch. In particular, the specific location L can be, for instance, the upper portion, the upper-middle portion, the middle portion, the lower-middle portion, and the lower portion of the furnace location. Moreover, the feedforward control is a function of y(x) and is influenced by the product information of the batch, such as the number of wafers of the batch and the product characteristic value. Moreover, the feedback control is a function of f(x), and is influenced by the results of the previous deposition process (i.e., the history information of the tool). The influencing factors contain, for instance, deposition time, deposition thickness, number of wafers, and product characteristic value of the history.

Then, as shown in FIG. 2, the manufacturing execution unit 107 is used to control the tool 102 to perform the deposition process according to the placement location of the wafers obtained from step S201 and the process parameter obtained from step S203 (step S204).

When the method of the invention is not used, the following issues are present: different uniformity caused by different locations of wafers placed in the furnace; greater variation to thickness deposited on the product caused by a thickness variation of about 20 Å of the monitor wafer in the upper portion of the furnace with the thickness variation on each product reaching 50 Å when the deposition process is performed via a method of mixed product; and significant loading effect caused by the number of wafers and the pattern density of the deposition . . . etc.

By using the control method and system of the invention to perform the deposition process of the furnace, the loading effect of the upper portion, the upper-middle portion, and the middle portion can be significantly improved. However, improvement to the loading effect of the bottom portion is less, which may be due to that the ventilation of the reactive gas occurs on the bottom portion of the tool such that chemical reaction is more complete and the loading effect is not significant.

Moreover, the process control method and system of the invention can also be applied in a deposition process performed via a mixed product method. The mixed product method refers to mixing products having different characteristic values during the deposition process so as to save time and cost, and performing the deposition process on all of the products at the same time.

Based on the above, the invention provides a process control method and system. Process time and heating region temperature are adjusted according to the number of wafers of the batch in the furnace so as to reduce thickness variation caused by the loading effect of the process. As a result, electrical and physical difference caused by the process can be reduced, process accuracy can be increased, process time can be reduced, and yield can be increased. Moreover, in the invention, by combining the advanced process control system, the target value prediction system, and the advanced dispatch control system, optimal placement location and optimal process parameter can still be provided to the wafers in the batch process even under a production state of highly-mixed products. As a result, variation to the wafers of the process is improved, the desired deposition thickness target value of each product wafer can be achieved, and electrical or physical variation caused in the process can also be reduced.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A process control method for performing a deposition process on a plurality of wafers of a batch, comprising:
   deciding a placement location of the wafers of the batch according to a history information of a tool and a product information of the batch;
   calculating a target value of each placement location according to the placement location of the wafers of the batch and the history information of the tool;
   calculating a process parameter according to the history information of the tool, the product information of the batch, and the target value of each placement location; and
   performing a deposition process according to the placement location of the wafers of the batch and the process parameter,
   wherein in the step of deciding the placement location of the wafers of the batch according to the history information of the tool and the product information of the batch, a minimum variation combination is calculated from formula (1) to perform a location sorting on the wafers of the batch:

$$\min\left(\sum_{i,j,k} L(i) \times F(j) \times w(k)\right) \quad (1)$$

in formula (1), L(i) is a characteristic of each batch before the process, F(j) is a uniformity characteristic of process location, and w(k) is a weight of each product toward a variation requirement.

2. The method of claim 1, wherein a target value of a specific location L of a placement of the wafers is calculated from formula (2):

$$\text{Monitor Target}^L = \alpha + \gamma(\text{thickness target value}) + \beta(\text{product}|\text{thickness target value}) \quad (2)$$

in formula (2), $\alpha$ is a basic deposition thickness value of a monitor wafer under a specific process method; $\gamma$ is an adjustment value of deposition thickness of the monitor wafer of all of the products under different target values; and β is an adjustment value of deposition thickness on the product of each product under a specific target value.

3. The method of claim 1, wherein the process parameter comprises a heating region temperature and a deposition time calculated according to a loading effect relationship, and the process parameter is obtained by calculating the deposition time first and then calculating a temperature needed for the heating region.

4. The method of claim 3, wherein the deposition time is calculated from formula (3):

$$\text{time}_t = g(\text{time}_{t-i}, \text{Monitor Target}_{t-i}^{CEN}, THK_{t-i}^{CEN}, \text{wafer count}_{t-i}, \text{Patten}_{t-i}) + m(\text{Monitor Target}_t^{CEN}, \text{wafer count}_t, \text{Patten}_t) \quad (3)$$

in formula (3), $\text{time}_t$ is a deposition time of a (t)th batch, a function of g(x) is a feedback control, a function of m(x) is a feedforward control, $\text{time}_{t-i}$ is a deposition time of a (t−1)th batch, Monitor $\text{Target}_{t-i}^{CEN}$ is a target value of deposition thickness of a middle location of the (t−1)th batch, Monitor $\text{Target}_t^{CEN}$ is a target value of deposition thickness of a middle location of the (t)th batch, $THK_{t-i}^{CEN}$ is a deposition thickness value of a middle location of the (t−1)th batch, wafer $\text{count}_t$ is a number of wafers of the (t)th batch, wafer $\text{count}_{t-i}$ is a number of wafers of the (t−1)th batch, $\text{Pattern}_t$ is a characteristic value of the (t)th batch, and $\text{Pattern}_{t-i}$ is a characteristic value of the (t−1)th batch.

5. The method of claim 3, wherein the heating region temperature is calculated from formula (4):

$$\text{temperature}_t^L = f(\text{time}_{t-i}, \text{temperature}_{t-i}^L, \text{Monitor Target}_{t-i}^L, THK_{t-i}^L, \text{wafer count}_{t-i}, \text{Patten}_{t-i}) + y(\text{Monitor Target}_{t-i}^L, \text{wafer count}_t, \text{Patten}_t) \quad (4)$$

in formula (4), $\text{temperature}_t^L$ is a temperature of a heating region of a specific location L of a (t)th batch, a function of f(x) is feedback control, a function of y(x) is a feedforward control, $\text{time}_{t-i}$ is a deposition time of a (t−1)th batch, $\text{temperature}_{t-i}^L$ is a temperature of a heating region of the specific location L of the (t−1)th batch, Monitor $\text{Target}_{t-i}^L$ is a target value of deposition thickness of the specific location L of the (t−1)th batch, Monitor $\text{Target}_t^L$ is a target value of deposition thickness of the specific location L of the (t)th batch, $THK_{t-i}^L$ is a deposition thickness value of the specific location L of the (t−1)th batch, wafer $\text{count}_t$ is a number of wafers of the (t)th batch, wafer $\text{count}_{t-i}$ is a number of wafers of the (t−1)th batch, $\text{Pattern}_t$ is a characteristic value of the (t)th batch, and $\text{Pattern}_{t-i}$ is a characteristic value of the (t−1)th batch.

6. The method of claim 1, wherein the tool comprises a furnace.

7. The method of claim 6, wherein the deposition process can be performed on the wafers of the batch via a mixed product method.

8. The method of claim 1, wherein the product information of the batch comprises a number of wafers and a product characteristic value.

9. The method of claim 1, wherein the history information of the tool comprises a deposition time, a deposition thickness, a number of wafers, and a product characteristic value of a history.

10. A process control system, comprising:
a tool performing a deposition process on a plurality of wafers of a batch;
a database for storing and providing a history information of the tool;
an advanced dispatch control unit deciding a placement location of each wafer according to the history information of the tool from the database and a product information of the batch;
a predicted target unit calculating a target value of each placement location according to the placement location of each wafer from the advanced dispatch control unit and the history information of the tool;
an advanced process control unit calculating a process parameter according to the history information of the tool from the database, the product information of the batch, and the target value of each placement location from the advanced dispatch control unit; and
a manufacturing execution unit driving the tool to perform the deposition process on the wafers according to the placement location of the wafers from the advanced dispatch control unit and the process parameter from the advanced process control unit,
wherein the placement location of each wafer is obtained by performing a location sorting on the wafers of the batch by calculating a minimum variation combination from formula (1) with the history information of the tool and the product information of the batch:

$$\min\left(\sum_{i,j,k} L(i) \times F(j) \times w(k)\right) \quad (1)$$

in formula (1), L(i) is a characteristic of each batch before the process, F(j) is a uniformity characteristic of process location, and w(k) is a weight of each product toward a variation requirement.

11. The process control system of claim 10, wherein a target value of a specific location L of a placement of the wafers is calculated from formula (2):

$$\text{Monitor Target}^L = \alpha + \gamma(\text{thickness target value}) + \beta(\text{product thickness target value}) \quad (2)$$

in formula (2), α is a basic deposition thickness value of a monitor wafer under a specific process method; γ is an adjustment value of deposition thickness of the monitor wafer of all of the products under different target values; and β is an adjustment value of deposition thickness on the product of each product under a specific target value.

12. The process control system of claim 10, wherein the process parameter comprises a heating region temperature and a deposition time calculated according to a loading effect relationship, and the process parameter is obtained by calculating the deposition time first and then calculating a temperature needed for the heating region.

13. The process control system of claim 12, wherein the deposition time is calculated from formula (3):

$$\text{time}_t = g(\text{time}_{t-i}, \text{Monitor Target}_{t-i}^{CEN}, THK_{t-i}^{CEN}, \text{wafer count}_{t-i}, \text{Patten}_{t-i}) + m(\text{Monitor Target}_t^{CEN}, \text{wafer count}_t, \text{Patten}_t) \quad (3)$$

in formula (3), $\text{time}_t$ is a deposition time of a (t)th batch, a function of g(x) is a feedback control, a function of m(x) is a feedforward control, $\text{time}_{t-i}$ is a deposition time of a (t−1)th batch, Monitor $\text{Target}_{t-i}^{CEN}$ is a target value of deposition thickness of a middle location of the (t−1)th batch, Monitor $\text{Target}_t^{CEN}$ is a target value of deposition thickness of a middle location of the (t)th batch, $THK_{t-i}^{CEN}$ is a deposition thickness value of the middle location of the (t−1)th batch, wafer count$_t$ is a number of wafers of the (t)th batch, wafer count$_{t-i}$ is a number of wafers of the (t−1)th batch, Pattern$_t$ is a characteristic value of the (t)th batch, and Pattern$_{t-i}$ is a characteristic value of the (t−1)th batch.

14. The process control system of claim 12, wherein the heating region temperature is calculated from formula (4):

$$\text{temperature}_t^L = f(\text{time}_{t-i}, \text{temperature}_{t-i}^L, \text{Monitor Target}_{t-i}^L, \text{THK}_{t-i}^L, \text{wafer count}_{t-i}, \text{Patten}_{t-i}) + y(\text{Monitor Target}_t^{CEN}, \text{wafer count}_t, \text{Patten}_t) \quad (4)$$

in formula (4), temperature$_t^L$ is a temperature of a heating region of a specific location L of a (t)th batch, a function of f(x) is a feedback control, a function of y(x) is a feedforward control, time$_{t-i}$ is a deposition time of a (t−1)th batch, temperature$_{t-i}^L$ is a temperature of a heating region of the specific location L of the (t−1)th batch, Monitor Target$_{t-i}^{CEN}$ is a target value of deposition thickness of the specific location L of the (t−1)th batch, Monitor Target$_t^{CEN}$ is a target value of deposition thickness of the specific location L of the (t)th batch, THK$_{t-i}^L$ is a deposition thickness value of the specific location L of the (t−1)th batch, wafer count$_t$ is a number of wafers of the (t)th batch, wafer count$_{t-i}$ is a number of wafers of the (t−1)th batch, Pattern$_t$ is a characteristic value of the (t)th batch, and Pattern$_{t-i}$ is a characteristic value of the (t−1)th batch.

15. The process control system of claim 10, wherein the tool comprises a furnace.

16. The process control system of claim 15, wherein the deposition process can be performed on the wafers of the batch via a mixed product method.

17. The process control system of claim 10, wherein the product information of the batch comprises a number of wafers and a product characteristic value.

18. The process control system of claim 10, wherein the history information of the tool comprises a deposition time, a deposition thickness, a number of wafers, and a product characteristic value of a history.

* * * * *